United States Patent
LaRoque (10) Patent No.: US 11,399,533 B2
(45) Date of Patent: *Aug. 2, 2022

(54) SMART MICRO-MOUSE TRAP

(71) Applicant: Dennis LaRoque, Davenport, IA (US)

(72) Inventor: Dennis LaRoque, Davenport, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/601,967

(22) Filed: Oct. 15, 2019

(65) Prior Publication Data

US 2020/0037601 A1 Feb. 6, 2020

Related U.S. Application Data

(63) Continuation of application No. 16/195,507, filed on Nov. 19, 2018, now Pat. No. 10,440,944.

(60) Provisional application No. 62/588,708, filed on Nov. 20, 2017.

(51) Int. Cl.
| | |
|---|---|
| *A01M 23/24* | (2006.01) |
| *A01M 23/16* | (2006.01) |
| *A01M 23/30* | (2006.01) |
| *A01M 31/00* | (2006.01) |

(52) U.S. Cl.
CPC .......... *A01M 23/245* (2013.01); *A01M 23/16* (2013.01); *A01M 23/30* (2013.01); *A01M 31/002* (2013.01)

(58) Field of Classification Search
CPC .... A01M 23/16; A01M 23/24; A01M 23/245; A01M 23/30; A01M 31/002
USPC ............... 43/77, 81, 81.5, 82, 83, 88, 92, 93
See application file for complete search history.

(56) References Cited

U.S. PATENT DOCUMENTS

| | | | |
|---|---|---|---|
| 1,992,353 A | 2/1935 | Donald | |
| 2,445,166 A | 7/1948 | Crumrine | |
| 2,472,806 A * | 6/1949 | Burns | A01M 23/38 |
| | | | 43/99 |
| 2,519,783 A | 8/1950 | Nagi | |
| 2,684,553 A | 7/1954 | Schroeder | |
| 4,483,094 A | 11/1984 | McKee | |
| 4,709,502 A | 12/1987 | Bierman | |
| 4,741,121 A * | 5/1988 | Pratscher | A01M 23/12 |
| | | | 43/58 |
| 5,107,619 A | 4/1992 | Zapata et al. | |
| 5,148,624 A | 9/1992 | Schmidt | |
| 5,185,953 A * | 2/1993 | Gross | A01M 23/12 |
| | | | 43/58 |

(Continued)

FOREIGN PATENT DOCUMENTS

WO 2016055804 A1 4/2016

OTHER PUBLICATIONS

Ozaydin et al., Smart Mouse Trap, Dec. 2012, NYU Poly; Polytechnic Institute of NYU.

*Primary Examiner* — Brady W Frazier
(74) *Attorney, Agent, or Firm* — Hamilton IP Law, PC; Jay R. Hamilton; Charles A. Damschen (57) ABSTRACT

A smart micro-mouse trap is disclosed herein which can be used to trap and kill the mouse, rat, rodent, etc. instantly. The embodiment comprises an enclosure for the mouse, a beam to detect the mouse, a trap, a latch and a solenoid powered by an electrical circuit to activate the tripping mechanism as the mouse enters the trap and breaks the beam. The smart micro-mouse trap is advantageous and useful as it is inexpensive, easy to operate, durable and allows for sanitary disposal of the dead mice, rats, rodents without contact to human.

6 Claims, 5 Drawing Sheets

(56) References Cited

U.S. PATENT DOCUMENTS

| | | | |
|---|---|---|---|
| 5,918,409 A | 7/1999 | Carnwath | |
| 5,950,354 A | 9/1999 | Carnwath | |
| 5,953,853 A | 9/1999 | Kim | |
| 6,202,340 B1 | 3/2001 | Nieves | |
| 6,807,767 B1 | 10/2004 | Schade | |
| 6,865,843 B1 | 3/2005 | Jordan | |
| 8,359,783 B1 * | 1/2013 | Kamery | A01M 23/20 43/61 |
| 2002/0011019 A1 | 1/2002 | Stoico et al. | |
| 2005/0097808 A1 * | 5/2005 | Vorhies | A01M 23/20 43/61 |
| 2008/0236023 A1 | 10/2008 | Thomas et al. | |
| 2009/0205244 A1 | 8/2009 | Pomerantz | |
| 2011/0023350 A1 | 2/2011 | Hovey | |
| 2011/0072708 A1 | 3/2011 | Nathan et al. | |
| 2011/0138676 A1 * | 6/2011 | Moustirats | A01M 31/002 43/61 |
| 2013/0031824 A1 | 2/2013 | Arlichson | |
| 2013/0174469 A1 | 7/2013 | Kittelson | |
| 2015/0000180 A1 | 1/2015 | Kamery et al. | |
| 2018/0317475 A1 | 11/2018 | Redmayne | |

* cited by examiner

SMART MICRO-MOUSE TRAP

CROSS REFERENCE TO RELATED APPLICATIONS

This application claims priority from non-provisional U.S. patent application Ser. No. 16/195,507 filed on Nov. 19, 2018 (issued as U.S. Pat. No. 10,440,944) which claimed priority from provisional U.S. Pat. App. No. 62/588,708 filed on Nov. 20, 2017, all of which are incorporated by reference herein in their entireties.

FIELD OF THE INVENTION

The present disclosure relates to an improved mouse trap, and in particular it relates to a smart micro-mouse trap using an infrared beam to detect the mouse as shown and disclosed herein.

STATEMENT REGARDING FEDERALLY SPONSORED RESEARCH OR DEVELOPMENT

No federal funds were used to develop or create the invention disclosed and described in the patent application.

REFERENCE TO SEQUENCE LISTING, A TABLE, OR A COMPUTER PROGRAM LISTING COMPACT DISK APPENDIX

Not Applicable.

AUTHORIZATION PURSUANT TO 37 C.F.R. § 1.171 (d)(c)

A portion of the disclosure of this patent document may contain material that is subject to copyright and trademark protection. The copyright owner has no objection to the facsimile reproduction by anyone of the patent document or the patent disclosure, as it appears in the Patent and Trademark Office patent file or records, but otherwise reserves all copyrights whatsoever.

BACKGROUND OF INVENTION

Mice, rats and rodents are generally known as destructive pests and transmitters for a number of serious diseases, carrying fleas, lice, and ticks. Mice and rats often carry insects and other undesirable species with them and leave dropping wherever they travel, causing food contamination and sickness to human. While seeking for food, mice and rats invade many home and commercial establishment and damage properties structures and chew electrical wiring which cause electrical fires. Thousands of rat bites are reported each year in United States alone, but still many rat bites are unreported. Therefore, numerous mouse traps have been provided in the past that are adapted to kill the mouse using electric or mechanism tripping. Although current electrical mouse trap may be popular and well known, they are characterized by a number of undesirable features, which limit their utility. For instance, the current electrical mouse trap may work efficiently with a mice or rat with a smaller size but not with a bigger size which may allow the mice or rat to escape. As disclosed, the embodiment is directed to a new and novel mouse trap that can kill the mice or rat instantly by releasing the spring-loaded arm to pin the rat or mice to the floor as the mice or rat enters and breaks the infrared beam. The smart micro-mouse trap works efficiently with mouse of any sizes. The bait can be simple as a peanut butter since the trap will be triggered by the infrared beam, not by eating the bait. In order to clean and reset the smart micro-mouse trap, the user may lift up the spring-loaded arm with a handle and dispose the mouse body to a disposal area directly, without direct human contact.

DETAILED DESCRIPTION—BRIEF DESCRIPTION OF DRAWINGS

The accompanying drawings, which are incorporated in and constitute a part of this specification, illustrate embodiments and together with the description, serve to explain and illustrate the principles of Safety apparatus and method for securing an infant carrier as disclosed herein.

DETAILED DESCRIPTION—LISTING OF ELEMENTS

| Element Description | Element Number |
|---|---|
| Trap | 1 |
| Spring-loaded arm | 1a |
| Trap spring | 1b |
| Trap mount | 1c |
| Circuit board | 2 |
|  | 2a |
| Electronic eye system | 2c |
| First wall (left) | 3a |
| Second wall (opposite with the enclosure) | 3b |
| Third wall (right) | 3c |
| Floor | 3d |
| Ceiling/lid | 3e |
| Window/Slot/Gap | 3f |
| Animal access opening | 4 |
| Infrared beam | 5 |
| Latch | 6 |
| Latch mount | 6a |
| Hinge | 6b |
| Indicator (light or beep sound) | 7 |
| Mirror (not shown) | 8 |
| Handle | 9 |
| Lifter | 9a |
| Bait | 10 |
| Power source | 20 |
| Battery | 20a |
| USB charger | 20b |
| Smart Micro-Mouse Trap | 100 |

DETAILED DESCRIPTION

Before the present methods and apparatuses are disclosed and described, it is to be understood that the methods and apparatuses are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and apparatuses. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and apparatuses. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and apparatuses may be understood more readily by reference to the following detailed description of preferred aspects and the examples included therein and to the Figures and their previous and following description.

Before the various embodiments of the present invention are explained in detail, it is to be understood that the invention is not limited in its application to the details of construction and the arrangements of components set forth in the following description. The invention is capable of other embodiments and of being practiced or of being carried out in various ways. Also, it is to be understood that phraseology and terminology used herein with reference to device or element orientation (such as, for example, terms like "front", "back", "up", "down", "top", "bottom", and the like) are only used to simplify description of the present invention, and do not alone indicate or imply that the device or element referred to must have a particular orientation. In addition, terms such as "first", "second", and "third" are used herein and in the appended claims for purposes of description and are not intended to indicate or imply relative importance or significance.

The following detailed description is of the best currently contemplated modes of carrying out illustrative embodiments of the invention. The description is not to be taken in a limiting sense but is made merely for the purpose of illustrating the general principles of the invention, since the scope of the invention is best defined by the appending claims. Various inventive features are described below herein that can each be used independently of one another or in combination with other features.

ILLUSTRATIVE EMBODIMENT AND ADVANTAGES OF INVENTION

Figure 1:
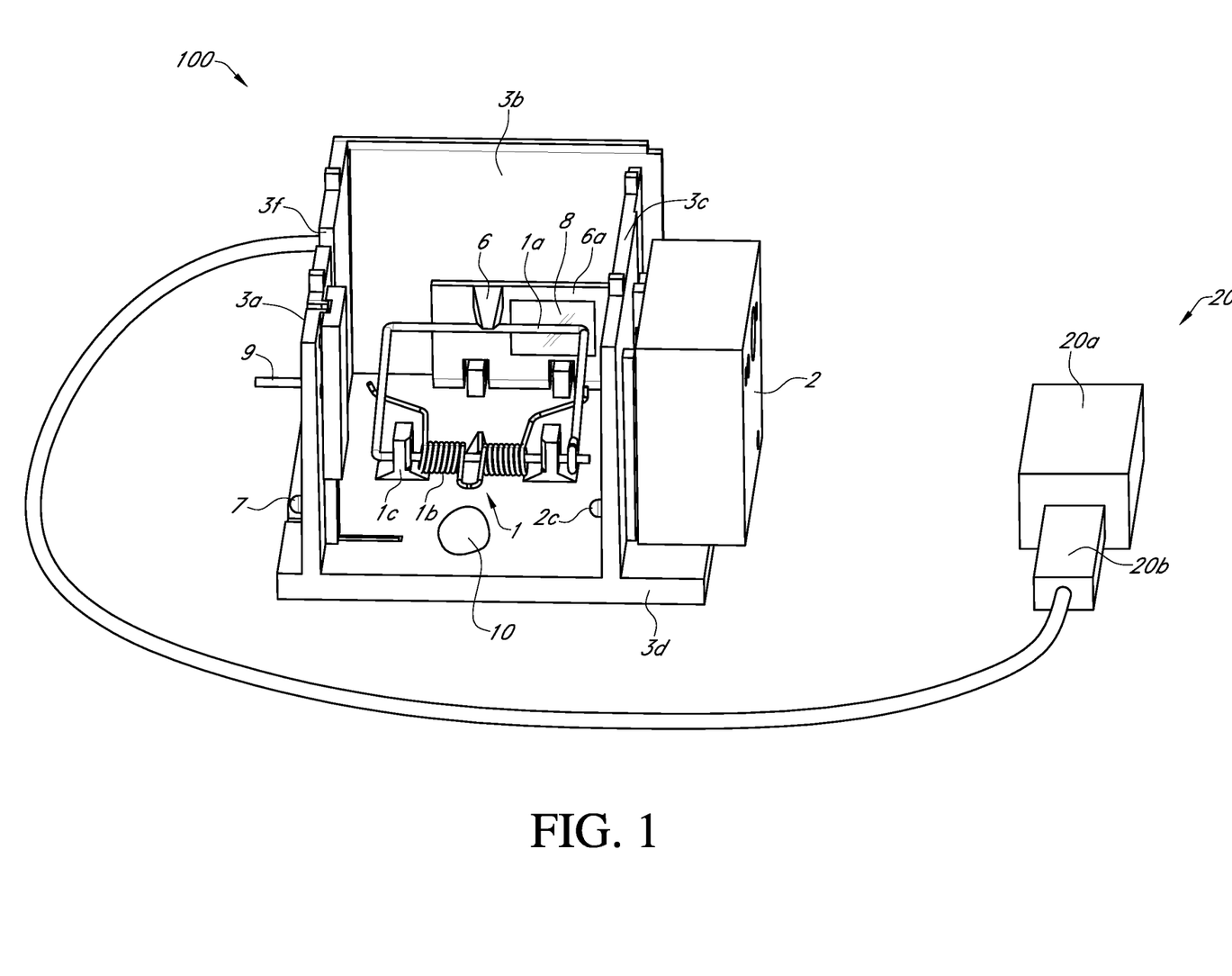
FIG. 1 is a perspective view of the smart micro-mouse trap having the lid removed disclosed herein along with detailed call-outs for enablement of the present disclosure.

Referring now to the drawings, wherein like reference numerals designate identical or corresponding parts throughout the several views, FIG. 1 is a perspective view of the smart micro-mouse trap 100 having a ceiling or a lid 3e removed disclosed herein along with detailed call-outs for enablement of the present disclosure. As shown, the smart micro-mouse trap 100 is comprised of a trap 1, a circuit board 2 powered by a power source 20, a latch mount 6a, an infrared beam 5 (not shown) produced by an electronic eye system 2c and walls 3. The enclosure is formed by having a first wall 3a, a second wall 3b and a third wall 3c configured to structurally support the smart micro-mouse trap 100. The first wall 3a, a second wall 3b and a third wall 3c may form an animal access opening 4 for the mice or rats 30 to enter. As shown, a slot 3f is positioned within the first wall 3a wherein the slot 3f may be configured as a gap or a window. The window may be transparent which allows the user to see through the enclosure. A latch mount 6a may be configured with a latch 6 and may be positioned on the second wall 3b as shown. The second wall 3b and the latch mount 6a are opposite the animal access opening 4. The first wall 3a and the third wall 3c are parallel to each other. The solenoid 2a, the actuator (not shown), and the electronic eye system 2c are enclosed within the circuit board 2 and are powered by a power source 20 which may be attached on the walls.

Another feature of the embodiment is an infrared beam 5 produced by an electronic eye system 2c wherein the electronic eye system 2c may be positioned on either the first wall 3a or on the third wall 3c or a combination of both walls, without any limitation and/or restriction unless otherwise indicated in the following claims. The electronic eye system 2c is positioned proximate to the animal access opening 4 in order to detect the entrance or the presence of the mice or rats 30 within the enclosure. The infrared beam 5 may be produced by an electronic eye system 2c and may be used to detect the presence of the mice or rat. One of ordinary skill will appreciate that the smart micro-mouse trap 100 may work effectively with any infrared beam 5, including but not limited to, a beam, a regular beam, a LED beam, etc. without any limitation and/or restriction, unless otherwise indicated in the following claims. Depending on the particular application, the infrared beam 5 (not shown) may have colors that are attractive to the mice or rats 30.

Figure 2:
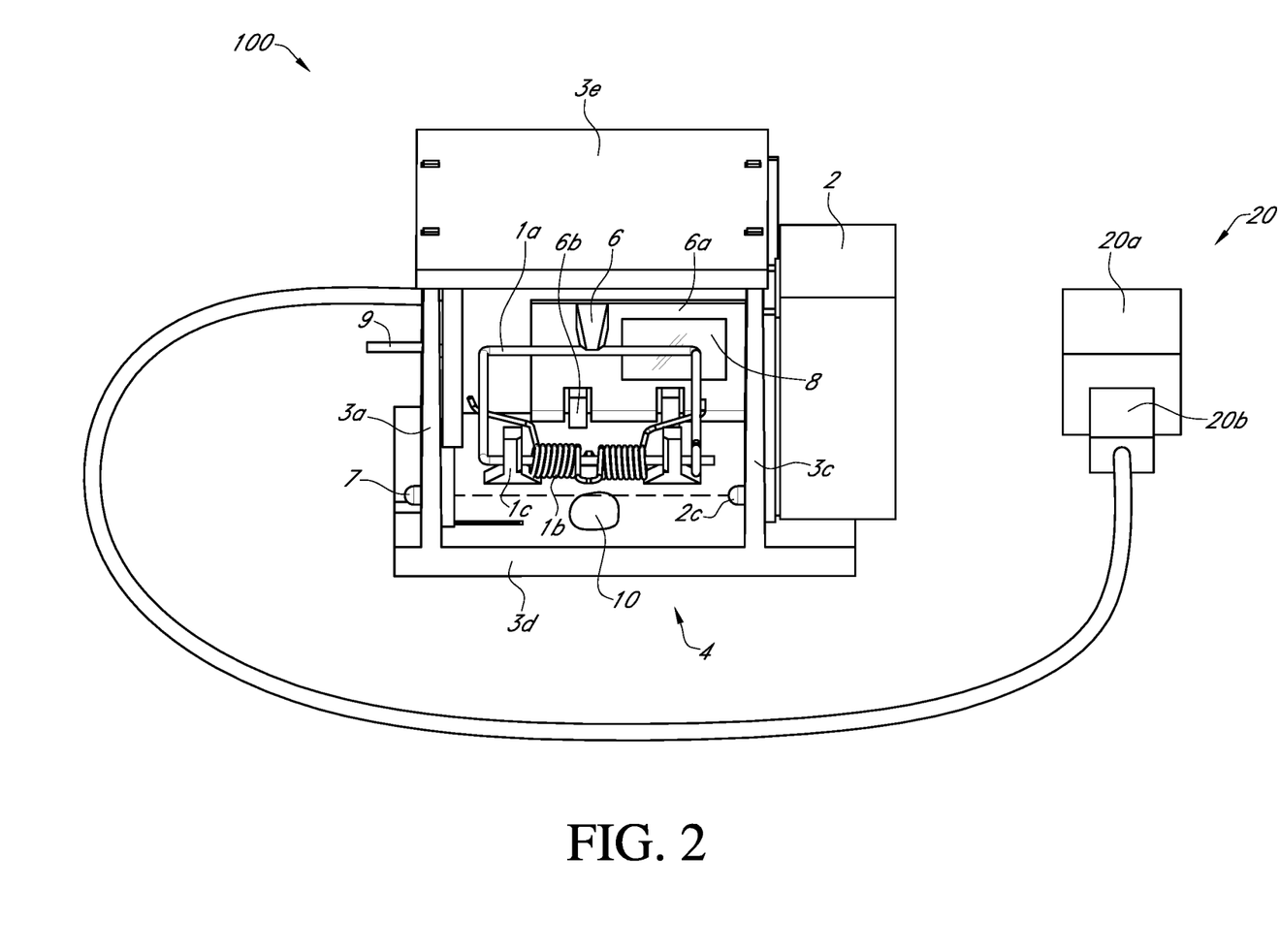
FIG. 2 is a front perspective view of the smart micro-mouse trap with the lid positioned on the top of the trap as disclosed in FIG. 1 herein.

FIG. 2 is a front perspective view of the smart micro-mouse trap 100 with the ceiling or the lid 3e positioned on the top of the trap as disclosed in FIG. 1 herein. One of ordinary skill will appreciate that the ceiling or lid 3 is removable which allows the user to check and set up the trap 1 with ease. The trap 1 is configured with a trap arm 1a, a spring-loaded arm 1b and a pair of trap mounts 1c for securing the trap 1 to the floor 3d. The trap mount 1c may be secured to the floor, but not limited to, the walls 3, the ceiling 3e, etc. without any limitation and/or restriction unless otherwise indicated in the following claims. One of ordinary skill will also appreciate that the spring-loaded arm 1a is swingable from a loaded position to a released position and is simple to load and set up. When preparing the smart micro-mouse trap 100, the user will pull the spring-loaded arm 1a to the loaded position wherein the spring-loaded arm is held by the latch 6 on the latch mount 6a positioned on the second wall 3b. When the mice or rats (not shown) enters the opening of the smart micro-mouse trap 100, the mouse's body breaks the infrared beam 5 (not shown) which activates the solenoid to unlock the latch 6 and release the spring-loaded arm 1a to the released position. Depending on the loading of the spring chosen, the trap 1 may contact and kill the mice or rats 30 pinning it to the floor 3d or contacts and pin the mice or rats to the floor 3d.

Figure 3:
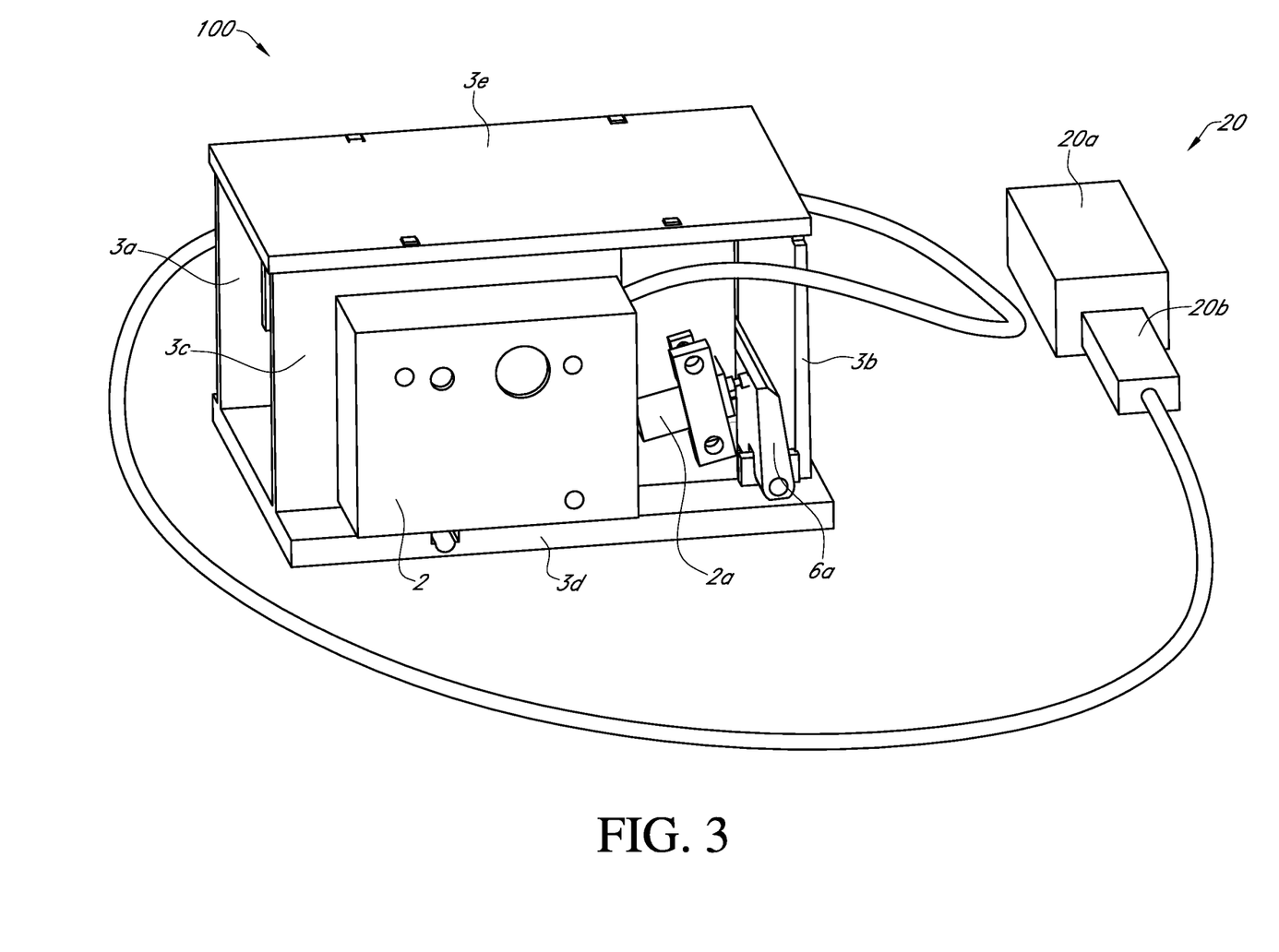
FIG. 3 is a right-side perspective view of the smart micro-mouse trap having the solenoid powered by the circuit board for the tripping mechanism as disclosed herein.
Figure 4:
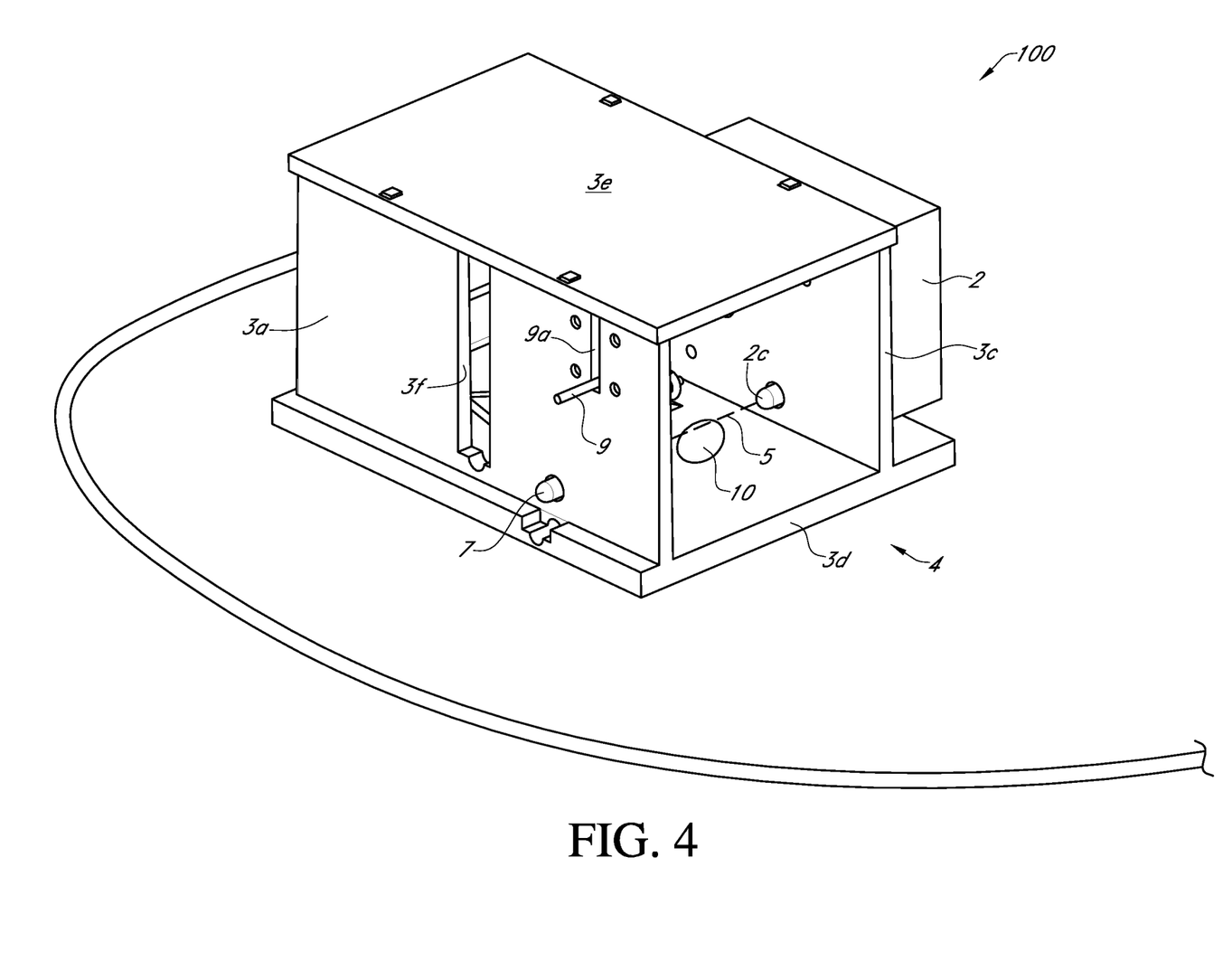
FIG. 4 is a left-side perspective view of the smart micro-mouse trap along with detailed call-outs as disclosed herein.
Figure 5:
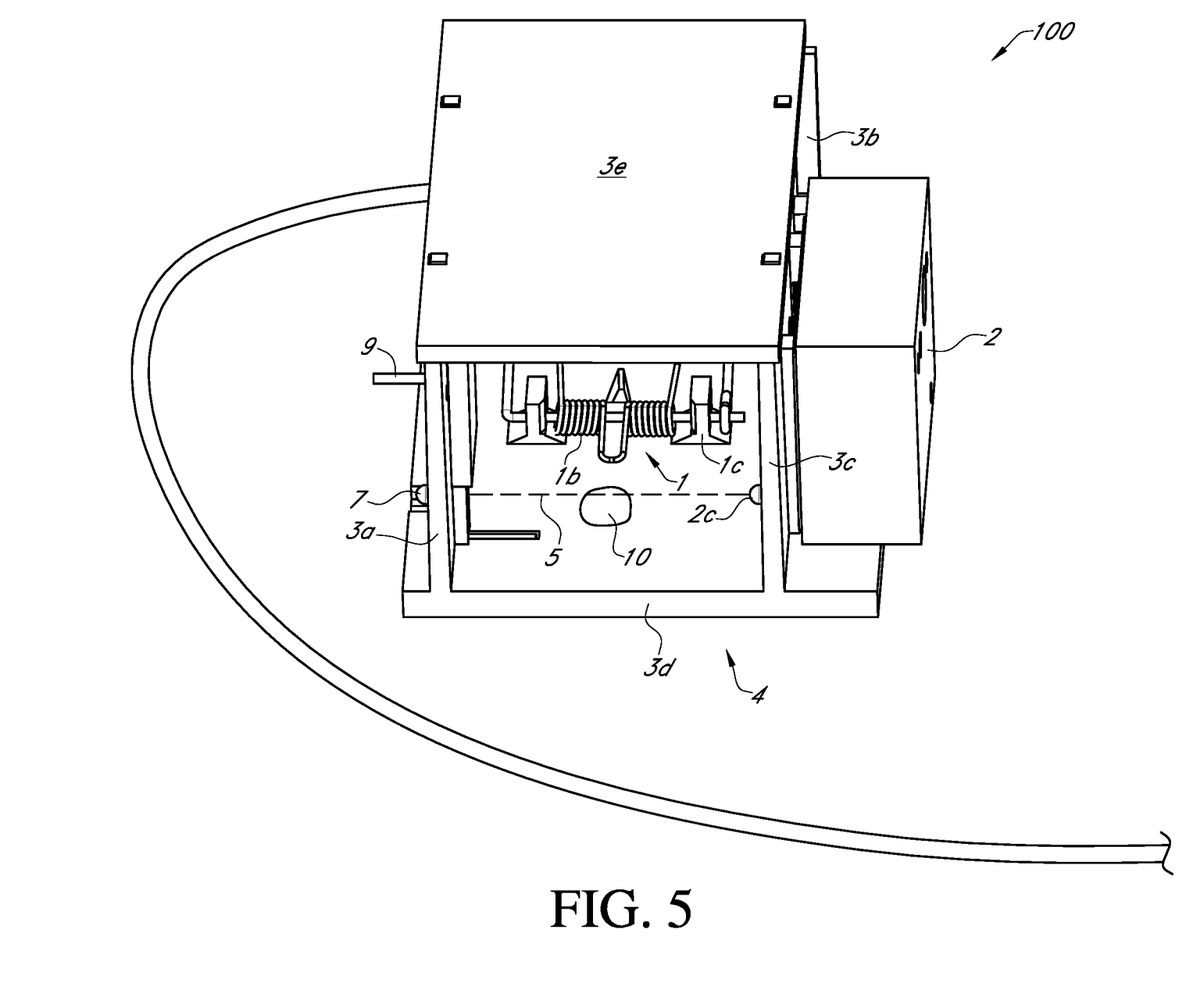
FIG. 5 is a perspective view of the smart micro-mouse trap having a bait inside the trap as disclosed herein.

Another aspect of the embodiment is shown in FIGS. 3-5. FIG. 3 is a right-side perspective view of the smart micro-mouse trap 100 having the solenoid 2a, the actuator 2b and the electronic eye system 2c are enclosed in the circuit board 2 and are powered by the power source 20 for the tripping mechanism as disclosed herein. The solenoid 2a, the actuator 2b, the electronic eye system 2c (not shown) may be mounted exteriorly the third wall 3c, but not limited to, the others walls (first wall 3a and second wall 3b), the interior of the walls, the ceiling, etc. As the mice or rats (not shown) enters the smart micro-mouse trap 100, the mice or rats 30 may cross and break the infrared beam 5 located proximate to the animal access opening 4 between the first 3a and third 3c walls, as shown in FIG. 1. The signal from the infrared beam 5 may trigger the solenoid which actuates the tripping mechanism and releases the trap arm 1a from the latch 6. The handle 9, located on the outside of the first wall 3a, may be designed to lift the spring-loaded arm up for removing the dead mice or rats and resetting the trap. The bait 10 may be simple such as a peanut butter or cheese for easy clean up but still are attractive to the mice or rats. The mice or rats will be trapped even if they just come to smell the bait 10. One of ordinary skill will also appreciate that the smart micro-mouse trap 100 works efficiently with mice or rats of various sizes. In addition, the user can move the trap to any location since the tripping mechanism is actuated by the solenoid 2a but not by small vibrations of the flapper.

FIG. 4 is a left-side perspective view of the smart micro-mouse trap 100 along with detailed call-outs as disclosed herein. As shown, there is a window or a slot 3f positioning at the center of the first wall 3a to facilitate assembly of the smart-micro mouse trap 100. In addition, the handle 9 is configured with a lifter 9a positioning outside the first wall 3a, in one configuration, but could be configured in other configurations as required by a particular application. One of ordinary skill will appreciate that the handle 9 and the lifter 9a allow the user to lift up the spring-loaded arm 1a and dispose the mice or rats body (not shown) directly to the garbage without human contact. Another aspect of the embodiment is the indicator 7 locating outside the first wall 3a. The indicator 7 could be a LED light, including but not limited to a color light, a beep sound, etc. without any limitation and restriction unless otherwise indicated in the following claims. When the smart micro-mouse trap 100 is ready, the indicator 7 may flash or beep to indicate or notify the user that the trap is ready.

Further, FIG. 5 is a perspective view of the smart micro-mouse trap 100 having a bait 10 inside the trap as shown throughout. The solenoid 2a that provides the tripping mechanism is energized for every 500 milliseconds to conserve energy. One of the ordinary skill will appreciate that the smart micro-mouse trap 100 is efficient, inexpensive and energy-saving. The smart micro-mouse trap 100 uses a combination of electrical detector and tripping mechanism to improve the efficiency and durability of the trap 1. One of ordinary of skill will also appreciate that each part of the smart micro-mouse trap 100 could be disassembled and/or replaced for clean-up and repair. As one of ordinary skill will appreciate, the sizes and dimensions of the trap 1 provided are for demonstrative purposes only and in no way limit the breadth of the disclosure.

In another version of the current embodiment, a mirror 8 (not shown) may be used to lure the mice or rats 30 to enter the enclosure. The mirror 8 (not shown) may be positioned on the walls 3, but not limited to, the second walls 3b, the latch mount 6a, etc. without any limitation and/or restriction unless otherwise indicated in the following claims. One of ordinary skill will appreciate that the mirror 8 may create some illusion and/or reflection to lure the mice or rats to enter the enclosure. Depending on the specific application, the mirror 8 can be customized and/or configured in a variety of manners. For example, the reflection level, the glass material, the size and shape of the mirror 8 may vary from one embodiment of the smart micro-mouse trap 100 to the next without any limitation and/or restriction unless otherwise indicated in the following claims. The smart micro-mouse trap 100 may substitute the mirror 8 by applying different materials such as silver coating mirrors or aluminum mirror or any reflective coating material, without any limitation and/or restriction.

Another aspect of the embodiment is the method of tripping and/or trapping the mice or rats. The infrared beam 5 is generated by powering the electronic eye system 2c and the solenoid 2a. The infrared beam 5 may position proximate the animal access opening to detect the presence of the mice or rats within the enclosure. A quantity of bait 10 may be placed within the enclosure proximate to the animal access opening to lure the mice or rats to enter the smart micro-mouse trap 100. When the mice or rats 30 enters the enclosure, the mice or rats 30 may break the infrared beam 5 which triggers the solenoid 2a and the latch 6 to release the spring-loaded arm 1a. The spring-loaded arm 1a can swing from the loaded position to the released position and pin the mice or rats to the floor. The user may remove the ceiling or lid 3e to check the mice or rats . The user may lift up the spring-loaded arm 1a by pulling the handle 9 up to dispose the dead mice or rats. One of ordinary skill will appreciate that the current embodiment allows the user to remove or dispose the dead mice or rats directly to the disposal area without direct human contact.

The current smart micro-mouse trap 100 may use a battery 20a to power the circuit board 2 having the solenoid 2a, the actuator 2b, the electronic eye system 2c. In another embodiment of the smart micro-mouse trap 100, the common USB charger module 20b may be used for powering the solenoid 2a, the actuator 2b, and the electronic eye system 2c. As shown, the power to the circuit board 2 may be at approximately 5 vdc for USB operation or may be at approximately 12 vdc for 12-volt battery operation. Depending on the specific application, the smart micro-mouse trap 100 may be powered by any power module and the voltage may be modified approximately 5 volts to 12 volts without any limitation and/or restriction unless otherwise indicated in the following claims. One of ordinary skill will appreciate that the power module may be customized and/or selected, and the voltage may be modified subject to a particular need, use or application. The smart micro-mouse trap 100 may be sold at a specific voltage. One of ordinary skill will also appreciate that by using USB charger or any power module, without any restriction and/or limitation, the smart micro-mouse trap 100 reduces the energy required to enable battery operation over a long period of time. A rechargeable power pack is considered for energy saving, battery waste reduction and durability of the current embodiment.

Depending on the specific application, the smart micro-mouse trap 100 can be customized and/or configured in a variety of manners. For example, the height, width, thickness, etc. of the first wall 3a, the second wall 3b, the third wall 3c, the floor 3d and the ceiling 3e, etc. may vary from one embodiment of the smart micro-mouse trap 100 to the next without any limitation and/or restriction unless otherwise indicated in the following claims. It is contemplated that for some applications it may be advantageous to configure the smart micro-mouse trap 100 such that it may be used by a certain percentage of the population of adult males, adult females, children between the ages of 8 and 14, etc.

As illustrated the attachment configuration does not require complex manufacturing; therefore, the production of the smart micro-mouse trap 100 would be relatively economical and have a low maintenance cost and/or be disposable. Additionally, as previously discussed the optimal configuration of the smart micro-mouse trap 100 (e.g. length, size, shape, etc.) may vary from one application to the next and is therefore in no way limiting to the scope of the present disclosure unless so indicated in the following claims. Another advantage of the illustrative embodiment is that, compared to prior art tool for mouse trap, the smart micro-mouse trap 100 may kill the mice or rats 30 instantly by breaking its body (especially its head and neck).

While certain specific embodiments have been described in detail, it is understood that the present disclosure will be appreciated by those skilled in the art and will be developed considering the overall teaching of the disclosure. Accordingly, the embodiments disclosed herein should not be construed as limiting on the scope of the invention, but that scope should be determined by the appended claims and their legal equivalents.

As one of ordinary skill will appreciate, the present disclosure is not limited by the means of construction or the materials chosen, as various suitable materials exist, including plastic, steel or aluminum, and combinations thereof without limitation unless so indicated in the following claims.

It should be noted that the Smart Micro-Mouse Trap 100 is not limited to the specific embodiments pictured and described herein but is intended to apply to all similar apparatuses and methods for providing the various benefits of those elements, which such benefits are explicitly and/or inherently disclosed herein. Modifications and alterations from the described embodiments will occur to those skilled in the art without departure from the spirit and scope of the present disclosure. Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Furthermore, variations and modifications of the foregoing are within the scope of the present disclosure. It is understood that the present disclosure extends to all alternative combinations of one or more of the individual features mentioned, evident from the text and/or drawings, and/or inherently disclosed. All of these different combinations constitute various alternative aspects of the present disclosure. The embodiments described herein explain the best modes known for practicing the present disclosure and will enable others skilled in the art to utilize the same. The claims are to be construed to include alternative embodiments to the extent permitted by the prior art.

Having described preferred aspects of the various methods and apparatuses, other features of the present disclosure will undoubtedly occur to those versed in the art, as will numerous modifications and alterations in the embodiments as illustrated herein, all of which may be achieved without departing from the spirit and scope of the present disclosure. Accordingly, the methods and embodiments pictured and described herein are for illustrative purposes only, and the scope of the present disclosure extends to all method and/or structures for providing the various benefits and/or features of the present disclosure and/or components thereof unless so indicated in the following claims. Furthermore, the methods and embodiments pictured and described herein are no way limiting to the scope of the present disclosure unless so stated in the following claims. Although specific advantages have been enumerated above, various embodiments may include some, none, or all of the enumerated advantages.

Any dimensions provided herein are for illustrative purposes only and in no way limit the scope of the present disclosure unless so indicated in the following claims. It should be noted that the present disclosure and/or components thereof are not limited to the specific embodiments pictured and described herein but are intended to apply to all similar apparatuses and methods for providing a predictive design analysis in a virtual environment. Modifications and alterations from the described embodiments will occur to those skilled in the art without departure from the spirit and scope of the present disclosure.

Any of the various features, components, functionalities, advantages, aspects, configurations, etc. for the present disclosure may be used alone or in combination with one another depending on the compatibility of the features. Accordingly, a nearly infinite number of variations of the present disclosure exists. Modifications and/or substitutions of one feature, component, functionality, aspect, configuration, etc. for another in no way limit the scope of the present disclosure unless so indicated in the following claims.

It is understood that the present disclosure extends to all alternative combinations of one or more of the individual features mentioned, evident from the text and/or drawings, and/or inherently disclosed. All of these different combinations constitute various alternative aspects of the present disclosure and/or components thereof. The embodiments described herein explain the best modes known for practicing the apparatuses, methods, and/or components disclosed herein and will enable others skilled in the art to utilize the same. The claims are to be construed to include alternative embodiments to the extent permitted by the prior art.

While the present disclosure has been described in connection with preferred aspects and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including but not limited to: matters of logic with respect to arrangement of steps or operational flow; plain meaning derived from grammatical organization or punctuation; the number or type of embodiments described in the specification.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

What is claimed is:

1. An electro-mechanical rodent trap comprising:
   a) an enclosure having a first wall, a second wall, a third wall and a floor wherein the floor and walls are connected together, and an animal access opening is positioned between and formed by the first wall and the third wall, wherein the animal access opening is positioned opposite the second wall;
   b) an electronic eye system mounted to the enclosure configured to generate a beam across the animal access opening;
   c) a trap having a spring-loaded arm positioned within the enclosure which may be loaded and unloaded;
   d) a powered solenoid mounted to the enclosure, the powered solenoid electrically coupled to the electronic eye system and mechanically coupled with the spring-loaded arm of the trap; and,
   e) a latch mount positioned proximate the floor and opposite the animal access opening.

2. The electro-mechanical rodent trap according to claim 1 wherein the floor is perpendicular to the walls of the enclosure.

3. The electro-mechanical rodent trap according to claim 1 wherein a latch mount is positioned on the wall opposite the animal access opening.

4. The electro-mechanical rodent trap according to claim 1 wherein the latch mount is electrically coupled to the electronic eye system and the powered solenoid to release the spring-loaded arm from a loaded position to a released position.

5. The electro-mechanical rodent trap according to claim 1 wherein a ceiling is removable and positioned on the enclosure.

6. The electro-mechanical rodent trap according to claim 1 wherein a quantity of bait is positioned within the enclosure proximate to the animal access opening.

* * * * *